United States Patent

[11] 3,579,821

[72] Inventor Albert G. Kurisu
Anaheim, Calif.
[21] Appl. No. 851,866
[22] Filed Aug. 21, 1969
[45] Patented May 25, 1971
[73] Assignee The United States of America as represented by the Secretary of the Navy

[54] METHOD OF MAKING CONFORMAL BLOCKS FOR EVAPORATIVELY COOLING CIRCUIT ASSEMBLIES
2 Claims, 2 Drawing Figs.

[52] U.S. Cl. ........ 29/627, 29/157.3, 29/527.1, 29/626, 174/68.5, 264/45, 264/272, 317/100, 317/234(1.5)
[51] Int. Cl. ........ H05k 3/28
[50] Field of Search ........ 29/626, 627, 527.1, 157.3; 317/100, 234(1.5); 174/68.5; 264/272, 45

[56] References Cited

UNITED STATES PATENTS

| | | | |
|---|---|---|---|
| 3,204,385 | 9/1965 | DeRemer et al. ........ | 264/45X |
| 3,334,684 | 8/1967 | Roush et al. ........ | 317/100X |
| 3,361,195 | 1/1968 | Meyerhoff et al. ........ | 317/100X |

*Primary Examiner*—John F. Campbell
*Assistant Examiner*—Robert W. Church
*Attorneys*—J. C. Warfield, Jr, George J. Rubens and John W. McLaren

ABSTRACT: A conformal block for evaporatively cooled modular electronic packages is disclosed. The conformal block provides a predetermined convective path for a coolant and controls the mixture ratio of the two-phase (liquid and vapor) flow to provide an optimized vapor/liquid mixture at the outlet port. This result is achieved by confining the components within a vertical flow duct and sizing the liquid inlet passage at the bottom of the block as a function of the heat load. The outlet port is located above the normal liquid level to prevent further liquid entrainment. The fixed location of the outlet provides a relatively consistent flow path to the condenser under adverse inclination angles in respect to gravity direction.

(a) (b) (c)

PATENTED MAY 25 1971

3,579,821

INVENTOR.
ALBERT G. KURISU

BY [signature]

[signature]
ATTORNEYS

METHOD OF MAKING CONFORMAL BLOCKS FOR EVAPORATIVELY COOLING CIRCUIT ASSEMBLIES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

One known method of maintaining temperature control of modular electronic packages is to immerse the electronic components in a fluorochemical liquid bath within a sealed enclosure. Cooling is affected by pool boiling at the heat sources and vapor condensation at the sink. The coolant normally used in this prior method, however, exhibits a high specific gravity and is relatively expensive. Furthermore, the vapor bubbles resulting from pool boiling generate a random fountain comprised of liquid and vapor at the liquid level. The proximity of the condensing surface is dictated by the height of this fountain to prevent condenser flooding which is detrimental to condenser efficiency.

SUMMARY OF THE INVENTION

A conformal block for evaporatively cooled modular electronic packages is disclosed. The conformal block provides controlled two-phase (liquid and vapor) flow. A controlled convective path for the coolant is provided and the mixed ratio of the two-phase flow is controlled by confining the components within a vertical flow duct and sizing the liquid inlet passage at the bottom of the block as a function of the heat load. This results in an optimized vapor/liquid mixture exiting at the outlet port which is located above the normal liquid level to prevent further liquid entrainment. The fixed location of the outlet port provides a relatively consistent flow path to the condenser under adverse inclination angles in respect to gravity direction. The conformal block is made from a low-density potting compound which is compatible with the coolant both electrically and chemically. The material does not outgas nor does it absorb the coolant.

STATEMENT OF THE OBJECTS OF THE INVENTION

An object of the present invention is the provision of a modular electronic package having improved cooling efficiency.

Another object of the present invention is the provision of a conformal block for evaporatively cooled modular electronic packages featuring a controlled convective path for the coolant and a controlled mixture ratio of the two-phase flow.

Another object of the present invention is the provision of a conformal block for evaporatively cooled modular electronic packages featuring a liquid inlet passage which is sized as a function of the heat load.

Another object of the present invention is the provision of a conformal block for cooling printed circuit modules in which dielectric fluid mass is reduced by displacement with a low-density material.

Another object of the present invention is the provision of a conformal block which provides structural rigidity and fluid damping to a printed circuit module.

Other objects and many of the attendant advantages of this invention will be readily appreciated as the same becomes better understood by reference to the following detailed description when considered in connection with the accompanying drawings wherein:

DESCRIPTION OF THE PREFERRED EMBODIMENT

Figure 1:
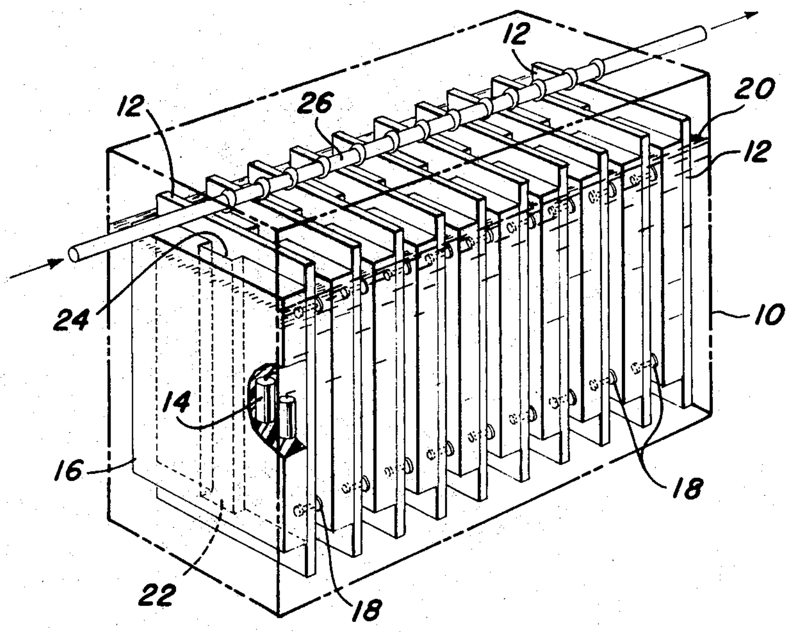
FIG. 1 is a perspective view, partly broken away, of an electronic module embodying the subject invention.

Referring to FIG. 1, an electronic module 10 includes a plurality of conventional circuit boards 12. The boards are arranged in a spaced parallel relationship to each other and have mounted thereon in a conventional manner capacitors, resistors, transistors and other electrical components 14. Also mounted on each circuit card 12 in a manner which substantially encloses the electrical components 14 is a conformal block 16 made of a suitable potting compound. Block 16 is called a conformal block because, as can be seen from FIG. 1, the potting material of which the block is made conforms roughly in its shape to the contour of the electrical components with which it is in contact. This feature will be described in more detail in the discussion of FIG. 2.

The conformal blocks 16 are mounted to their respective circuit cards 12 by means of four conventional fasteners. The circuit cards plug into card connectors at the rear of module 10 and are supported by circuit card guides (not shown) in a conventional manner.

Electronic module 10 constitutes a sealed enclosure containing therein a fluorochemical liquid 20. The liquid 20 circulates through each of the conformal block-circuit board assemblies by means of liquid inlet 22 which is shown in FIG. 1 and by means of liquid exit port 24 on conformal block 16. Also contained within the electronic module 10 is a heat exchanger or condenser 26. Water, which is the primary coolant in the condenser flows in the direction indicated by the arrows. The heat exchanger 26 functions in a well-known manner.

Figure 2:
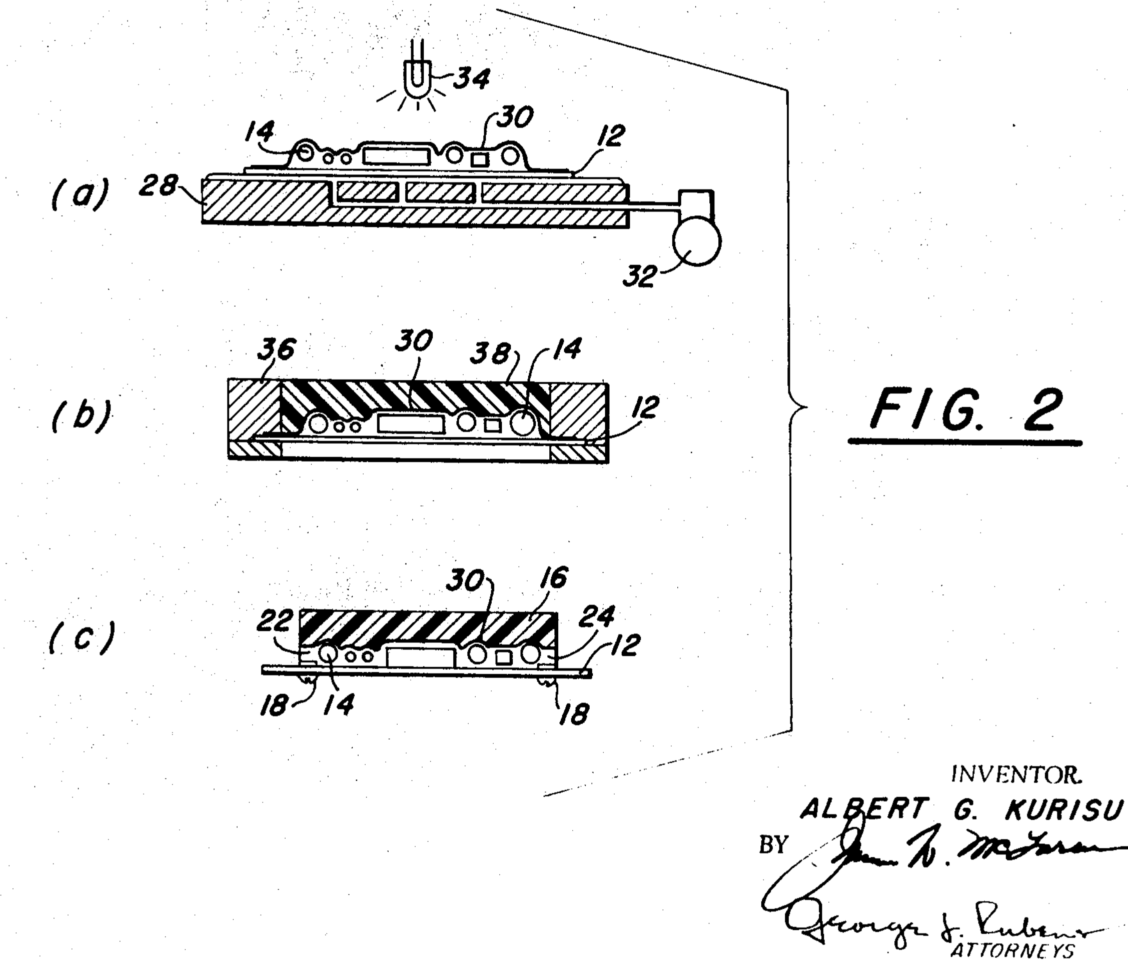
FIG. 2(*a*), (*b*), and (*c*) are illustrations of the various stages involved in the making of the conformal block of the present invention.

FIG. 2(*a*), (*b*) and (*c*) illustrate the steps involved in making the conformal block of the present invention. In FIG. 2(*a*), conventional circuit card 12 is placed in a blister packaging kit 28. An acetate blister package 30 is formed over the electronic components 14 by means of a vacuum pump system 32 and heat from an infrared lamp 34.

In FIG. 2(*b*), the completed blister package 30 and circuit card 12 are placed in a mold 36. A low density potting compound 38 is poured into the mold and allowed to set to form the conformal block 16. It should be noted that as the potting compound 38 is poured into the mold, it assumes the shape of the electrical components 14 with which it is in contact, i.e., the potting compound roughly conforms to the shape of the electrical components as can be seen in FIG. 2(*b*).

In FIG. 2(*c*), an inlet channel or fluid inlet 22 and an outlet liquid-vapor channel or exit 24 are machined in the conformal block 16 after it is removed from the mold 36. The inlet channel and outlet channel are machined on oppositely disposed sides (the sides which are machined depend on final orientation of the block). Mounting holes (not shown) are drilled in each of the four top side corners of the conformal block and on corresponding portions of the circuit cards. The conformal block is then bolted by means of conventional fasteners (not shown) to the circuit card. Suitable spacers may be used along the vertical edges to prevent the components from contacting the conformal surfaces. The conformal block circuit card assembly is plugged into a card connector and supported by card guides in a conventional manner.

The assembled package is installed in the liquid bath 20 with its inlet ports 22 and outlet ports 24 coincident to the vertical axis of the electronic module 10. Thus, the fluorochemical liquid 20 enters into the bottom inlets 22. Vapor is generated at the heat sources (the electrical components) and a resultant liquid-vapor mixture exits at the outlet ports 24.

From FIG. 1, it can be seen that the invention provides a controlled convective path for the coolant 20 while controlling the mixture ratio of the two-phase (liquid and vapor) flow. This is accomplished by confining the flow mixture within a vertical flow duct between the inside surface of the conformal block and the components, and by sizing the liquid inlet passage 22 as a function of the heat load. This procedure results in an optimized vapor-liquid mixture exiting at the outlet 24. Outlet 24 is always located above the normal liquid level to prevent further liquid entrainment. Furthermore, the fixed location of the outlet port 24 provides a relatively consistent flow path to the condenser 26 even under adverse inclination angles with respect to gravity direction.

By displacing the heavy coolant fluid of the prior art with a low-density potting material, the fluid mass is appreciably reduced. The low-density material must be compatible with the fluorochemical liquid 20, both electrically and chemically. The material must not outgas to prevent noncondensible gas effects on condenser efficiency. Also, it must not absorb the fluid to maintain a fairly constant liquid level. A low density (0.7) potting compound comprised of glass microballoons in an epoxy binder can be used to meet the stringent requirements.

Implementation of the two primary objectives results in several additional benefits. Cover protection for the electronics during assembly and storage is provided and added structural rigidity of the module results. The conformal block is removable from the circuit card for ready access to components. Also, additional fluid damping results, and substantially greater boiling heat transfer is generated due to increased flow velocity. The use of the conformal blocks of the present invention, furthermore, provides appreciable cost and weight savings, especially where irregular shaped inductors and circuit cards comprising physically large SCR's and smaller resistors and diodes and capacitors are involved.

For example, for every inch of potting compound used, a weight saving of 0.6 pounds (equivalence of water) is realized. The raw material cost of the low density compound is considerably less than the cost per gallon for a fluorochemical liquid. Furthermore, a conformal block is relatively permanent as compared with the fluorochemical fluid which is subject to evaporation loss and contamination.

Thus, it can be seen that a new and improved method for cooling modular electronic packages by means of a unique conformal block has been disclosed. Obviously many modifications and variations of the present invention are possible in the light of the above teachings. It is therefore to be understood that within the scope of the appended claims, the invention may be practiced otherwise than as specifically described.

I claim:

1. The method of making a conformal block for evaporatively-cooled electronics comprising the steps of:

1. applying an acetate film by means of a vacuum and infrared heat over a circuit board having electronic components mounted thereon to thereby form an acetate blister package over said electronic components;
2. placing said blister package in a mold form;
3. pouring a low-density potting compound into said mold form over the blister package enclosing said components;
4. allowing said potting compound in said mold to set to form said conformal block having a surface substantially conforming to said components;
5. removing said block from the blister package and machining inlet and outlet channels in said conformal block on oppositely disposed sides thereof; and
6. mounting said conformal block with said surface contiguous to said components on said circuit board by means of conventional fasteners.

2. The method of claim 1 wherein said acetate film applied over said circuit board is removed before said inlet and outlet channels are machined.